United States Patent
Mahowald et al.

(10) Patent No.: US 7,386,639 B2
(45) Date of Patent: Jun. 10, 2008

(54) SWITCH FOR COUPLING ONE BUS TO ANOTHER BUS

(75) Inventors: Peter H. Mahowald, Los Althos, CA (US); Takashi Hidai, Palo Alto, CA (US); Frederick W. Miller, San Jose, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 6 days.

(21) Appl. No.: 10/345,899

(22) Filed: Jan. 15, 2003

(65) Prior Publication Data

US 2004/0139247 A1 Jul. 15, 2004

(51) Int. Cl.
*G06F 3/00* (2006.01)

(52) U.S. Cl. .............. 710/14; 710/104; 710/240

(58) Field of Classification Search ............ 710/36, 710/38, 62, 65, 14, 107, 240
See application file for complete search history.

(56) References Cited

U.S. PATENT DOCUMENTS

| | | | | |
|---|---|---|---|---|
| 5,157,772 A | * | 10/1992 | Watanabe | 710/307 |
| 5,564,061 A | * | 10/1996 | Davies et al. | 710/64 |
| 5,671,424 A | * | 9/1997 | Wisor et al. | 710/269 |
| 5,928,361 A | * | 7/1999 | Nishimura | 713/200 |
| 5,958,025 A | * | 9/1999 | Sonobe | 710/27 |
| 6,037,928 A | * | 3/2000 | Nachinson et al. | 345/156 |
| 6,081,863 A | * | 6/2000 | Kelley et al. | 710/312 |
| 6,141,717 A | | 10/2000 | Yamanol et al. | |
| 6,202,160 B1 | | 3/2001 | Sheikh et al. | |
| 6,233,639 B1 | * | 5/2001 | Dell et al. | 710/301 |
| 6,510,522 B1 | * | 1/2003 | Heinrich et al. | 726/34 |
| 6,745,310 B2 | * | 6/2004 | Chow et al. | 711/170 |
| 2001/0049803 A1 | * | 12/2001 | Kurafuji | 714/30 |
| 2002/0031139 A1 | | 3/2002 | Yoshizawa | |

FOREIGN PATENT DOCUMENTS

| | | |
|---|---|---|
| JP | 04205239 | 7/1992 |
| JP | 09146845 | 6/1997 |
| JP | 11338849 | 12/1999 |

\* cited by examiner

*Primary Examiner*—Kim Huynh
*Assistant Examiner*—Eron Sorrell

(57) ABSTRACT

A communication module includes a switch circuit operable to connect an internal bus to an external bus for, e.g., diagnostics, verification, and fault analysis. The internal bus allows data communication between electronic components internal to the communication module, and the external bus allows data communication between at least one internal electronic component and a device external to the communication module. The switch circuit may be controlled via a programmable and password protected register within the communication module.

29 Claims, 3 Drawing Sheets

SWITCH FOR COUPLING ONE BUS TO ANOTHER BUS

BACKGROUND OF THE INVENTION

Referring to FIG. 1, a conventional fiber-optic communication module 100, which may be used in a digital communication system, typically includes a receiver section 101, a transmitter section 102, and a controller section 103, which are all coupled via an internal bus 105. In some communication modules (not shown), the internal bus is an analog bus. However, because of the many signals to be communicated between the receiver, transmitter and controller, the number of wire traces needed in such an analog bus may become too numerous for practical application. Therefore, the internal bus 105 is a digital bus. In operation, the controller 103 controls and monitors the receiver 101 and transmitter 102 via the bus 105.

The communication module 100 also communicates with one or more external devices 120, via an external bus 115. Typical external devices 120 include diagnostic devices and configuration devices. The external bus 115 is coupled to the transmitter 102, (although it may be coupled to the controller 103 or the receiver 101). This allows the external device 120 to communicate with the receiver 101, and controller 103 via the transmitter 102 and bus 105 that act as an interface to the external device 220.

The external device 120, however, does not have direct access to the internal bus 105, and thus, does not have direct access to the receiver 101 and the controller 103. And, even though the bus 115 is directly coupled to the transmitter 102, the external device may be unable to the control the transmitter 102 to the extent that the controller 103 can. Consequently, it is sometimes difficult to externally troubleshoot the communication module 100 because access to the internal bus 105 is often imperative for diagnostics, verification, and fault analysis.

One solution is to implement an entire separate (from the bus 115) bus connection (not shown) for data exchange and communication between an external device and the internal bus 105, but this may increase the complexity and pinout of the module 100, and may introduce noise on the bus 105. Furthermore, it is often difficult to physically probe with the internal bus 105 from the outside of the communication module 100 because the internal bus 105 may be within an intermediate, and thus, inaccessible, layer of a printed circuit board.

SUMMARY OF THE INVENTION

In one aspect of the invention, a communication module includes a switch circuit operable to connect an internal bus to an external bus for, e.g., diagnostics, verification, and fault analysis. The internal bus allows data communication between electronic components internal to the communication module, and the external bus allows data communication between at least one internal electronic component and a device external to the communication module. The switch circuit may be controlled via a programmable and password protected register within the communication module.

One advantage of a communication module having a diagnostic switch is that by coupling the external bus directly to the internal bus, diagnostics, verification and fault analysis can be performed on the communication module externally. By using the external bus for connection to the internal bus, a separate diagnostics bus is unnecessary, thus, the total number of pins external to the module is reduced. Furthermore, the communication module need not be disassembled during diagnostics, verification, and fault analysis.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following discussion is presented to enable a person skilled in the art to make and use the invention. The general principles described herein may be applied to embodiments and applications other than those detailed below without departing from the spirit and scope of the present invention. The present invention is not intended to be limited to the embodiments shown, but is to be accorded the widest scope consistent with the principles and features disclosed or suggested herein.

Figure 1:
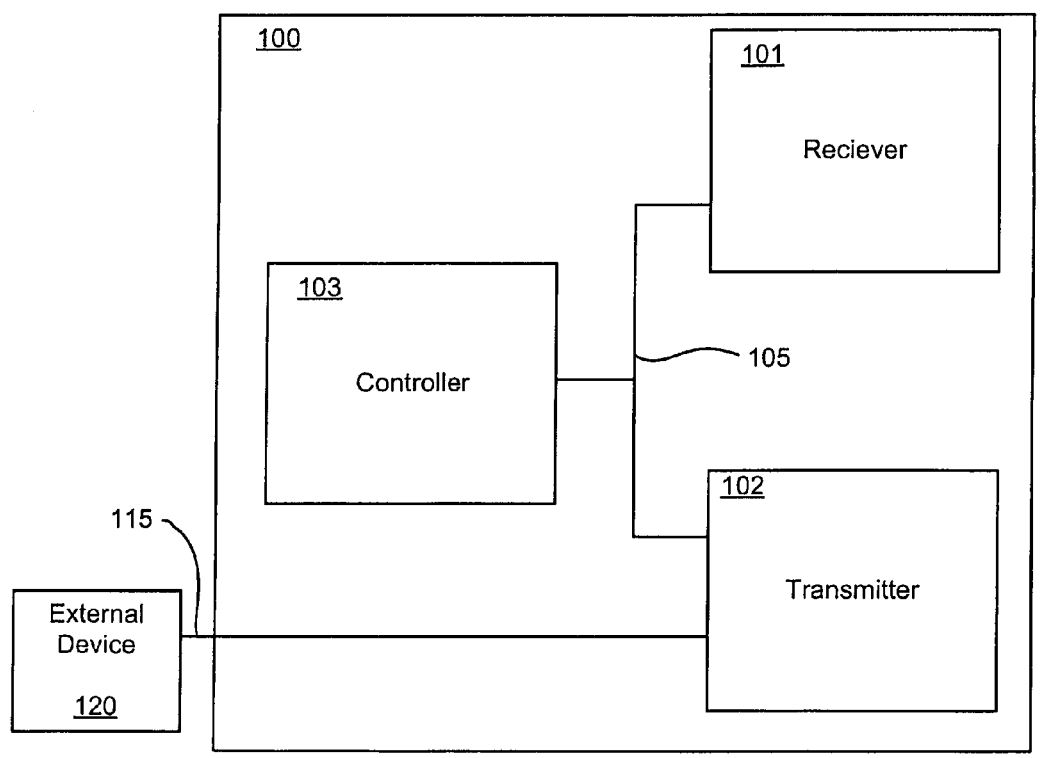
FIG. 1 is a block diagram of a conventional fiber-optic communication module.
Figure 2:
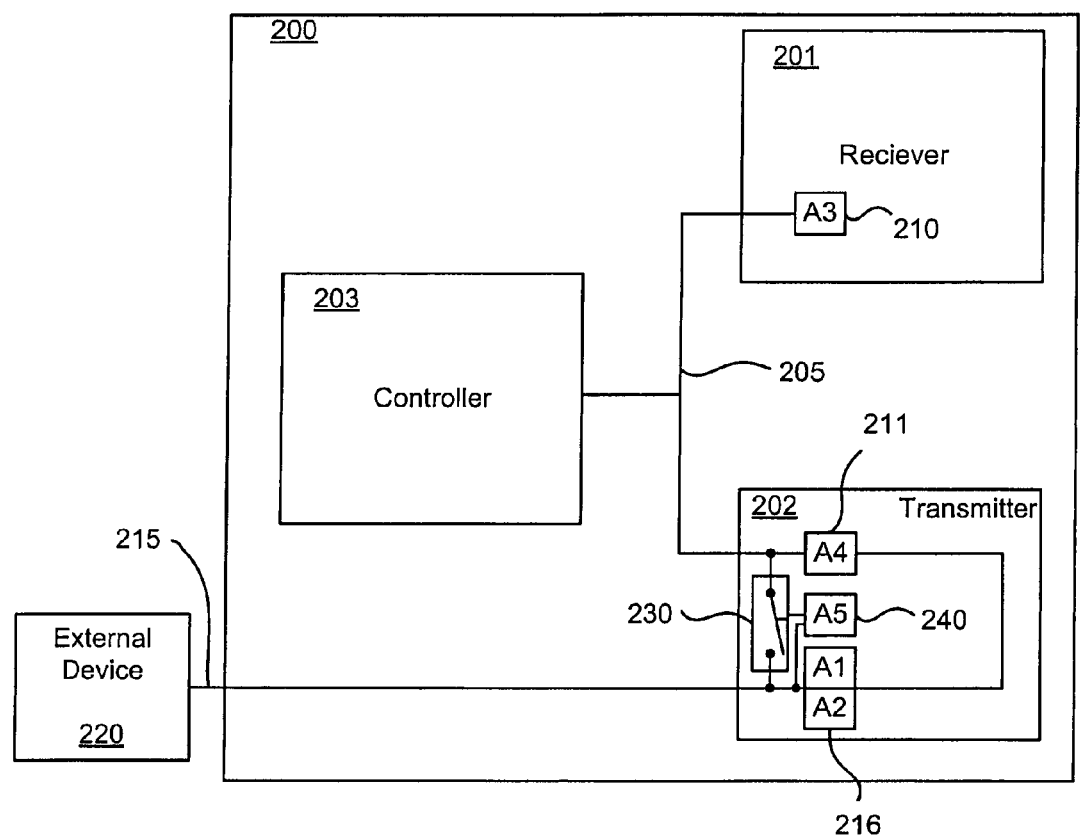
FIG. 2 is a block diagram of a fiber-optic communication module according to an embodiment of the invention.

FIG. 2 is a block diagram of a fiber-optic communication module 200 according to an embodiment of the invention. Like the communication module 100 of FIG. 1, the communication module 200 of FIG. 2 comprises a plurality of internal electronic components including a receiver 201, a transmitter 202, and a controller 203, which are coupled to an internal two-wire serial digital bus 205. Each of these electronic components may be disposed on a separate integrated circuit or may comprise different areas of a single integrated circuit. Likewise, the internal bus 205 may be disposed within an integrated circuit or may comprise a separate bus structure within the communication module 200.

The controller 203 is the bus master for the internal bus 205 and facilitates communications between the other internal electronic components such as the receiver 201 and the transmitter 202. The internal bus 205 allows data to be read from and written to registers residing in memory and that are referenced by bus addresses within the receiver 201 and the transmitter 202. For example, the internal bus 205 is coupled to the A3 registers 210 in the receiver 201 and the A4 registers 211 in the transmitter 202. In one embodiment, there are 256 A3 registers 210 and 256 A4 registers 211.

The communication module 200 also coupled to an external bus 215, which is designed to allow an external device 220 to read from and write to registers that interface the external bus 215 to the internal bus 205 during normal operation of the module 200. Specifically, the external bus 215 is coupled to the A1 and A2 cache registers 216 of the transmitter 202. The implementation of the cache registers 216 is disclosed in related U.S. patent application Ser. No. 10/346,479 entitled EEPROM Emulation in a Transceiver filed on Jan. 15, 2003 which is assigned to Agilent Technologies of Palo Alto, Calif. and is incorporated by reference. Although the bus 215 is described as "external" a portion of the bus 215 may be disposed within the module 200. Consequently, "external" refers to the fact that the bus 215 allows a direct connection between one or more external devices 220 and the A1 and A2 cache registers 216

During normal operation, the external device 220 accesses a particular register within cache registers 216 with a three cycle access procedure. During the first cycle, the external device 220 sends an address on the external bus 215 that selects either the A1 or A2 registers 216. Then, the external device 220 sends an offset value on the external bus 215 that indicates which of the registers within the selected A1 or A2 216 registers that is to be accessed. Third, data is written from the external device 220 to the selected cache register 216, or the external device 220 reads data from the selected cache register 216. Since, during normal operation, the external device 220 only has access to the A1 and A2 cache registers 216, it does not have direct access to other internal registers that are coupled to the internal bus 205. That is, the external device 220 does not have direct access to the internal bus 205 during normal operation of the module 200. Not allowing the external device 220 direct access to the internal bus 205 during normal operation is typically desired because the external device 220 may interfere with the operation of the internal bus 205 or vice versa. Furthermore, by not allowing the external device 220 direct access to the internal bus 205 during normal operation, the traffic on the internal bus 105 is hidden.

As was discussed above, during testing or troubleshooting of the communication module 200, it is often desirable to monitor the data traffic on the internal bus 205 and to read from and write to registers such as the A3 registers 210 and A4 registers 211, that are directly accessible only via the internal bus 205. Thus, the transmitter 202 includes an analog switch circuit 230 that connects the internal bus 205 to the external bus 215 when closed. For example, the switch circuit 230 could be closed during diagnostics, verification, and fault analysis to allow an external device 220 coupled directly to the external bus 215 to monitor the data traffic on the internal bus 205 or to control the components of the module 200 connected to the internal bus 205. To allow the direct connection between the busses 205 and 215 as provided by the switch circuit 230, the internal bus 205 and external bus 215 are compatible or identical, both in physical structure and in protocol. If the busses 205 and 215 have multiple lines, then the switch circuit 230 may include individual switches (such as transistors, not shown) to connect the lines of the internal bus 205 to the lines of the external bus 215, respectively. If, however, the internal bus 205 and external bus 215 have different physical structures or different protocols, then the module 200 may include a more complex bus interface (not shown) between the internal bus 205 and the external bus 215.

Still referring to FIG. 2, one or more A5 registers 240 control the operation of the switch circuit 230. Because the A5 registers 240 are connected to the external bus 215, and are, thus, directly accessible to the external device 220, the external device 220 can open and close the switch circuit 230 by writing a proper data value to the A5 registers 240. In one embodiment, the A5 register 240 is password protected with a password protection scheme (virtually any scheme can be used), so that it can only be accessed with a proper password. Therefore, during diagnostics, verification, or fault analysis, the external device 220 writes the password to a first of the A5 registers 240 and sets a flag (not shown) in a second of the A5 registers 240 to close switch circuit 230 thereby connecting the external bus 215 to the internal bus 205. Likewise, to return to normal operation, the external device 220 clears the flag in the same manner. In one embodiment, only the manufacturer knows the password and, thus, only the manufacturer can enter the password so as to couple the internal bus 205 to the external bus 215 for diagnostics, verification, and fault analysis. Alternatively, a customer may be provided the password so that the customer can connect the internal bus 205 to the external bus 215.

Still referring to FIG. 2 as discussed above, once the external bus 215 is connected to the internal bus 205, then the external device 220 can monitor the bus traffic on the internal bus 205 as generated by the controller 203. Furthermore, in one embodiment, the bus protocol of both the internal bus 205 and external bus 215 allows multiple bus masters. As such, the external device 220 can actually issue commands on the internal bus 205 to control the controller 203 or to control the entire module 200. For example, one can simulate the module 200 using a personal computer (PC) as the external device 220. Once the desired operation is verified, the PC can load the appropriate corresponding program into the controller 203 (or into a separate memory location not shown) so that the controller 203 will operate the module 200 in the desired manner.

Figure 3:
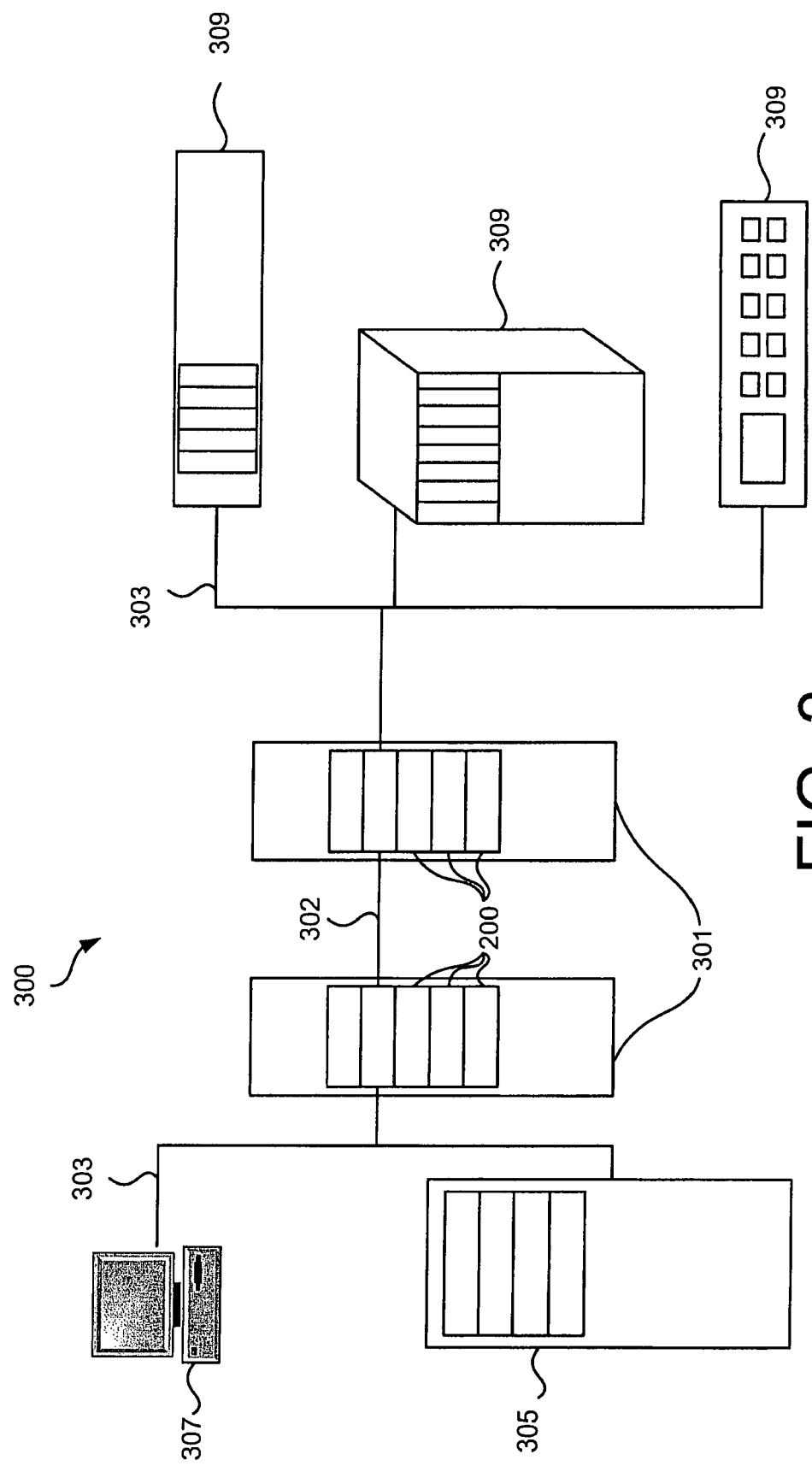
FIG. 3 is a block diagram of a digital communication system that incorporates one or more of the fiber-optic communication modules of FIG. 2 according to an embodiment of the invention.

FIG. 3 is a block diagram of a digital communication system 300 that incorporates one or more fiber-optic communication modules 200 of FIG. 2 in accordance with an embodiment of the invention. The system 300 includes devices operable to communicate digitally with each other. Such devices include high-volume database computers 305, server computers 307, and network devices 309 (hubs, routers, switches). A conventional TX/RX link 303 couples the devices to a communication hub 301 that is operable to house several communication modules 200.

In one embodiment, each module 200 comprises one or more channels for receiving and transmitting data via a fiber-optic network. In one embodiment, each communication module 200 incorporates eight independent data channels (four transmit and four receive channels) operating from 1 to 3.2 Gb/s per channel for digital communication between devices. Such a communication module 200 is disclosed in a related U.S. patent application Ser. No. 10/327,216 entitled Integrated Multichannel Laser Driver and Photodetector Receiver filed on Dec. 20, 2002 which is assigned to Agilent Technologies of Palo Alto, Calif. and which is incorporated by reference. The communication module 200 can then communicate with other modules through a fiber-optic communication link 302. As such, devices such as high-volume database computers 305, server computers 307, and network devices 309 (hubs, routers, switches etc.) can communicate efficiently and effectively using the multichannel capabilities of the communication modules 200.

We claim:

1. A module comprising:

first and second electronic components that are internal to the module;

a first bus coupled to and operable to allow data communication between the first and second electronic components;

a second bus coupled to the first electronic component and operable during a first mode of operation to allow data communication between the first electronic component and a device external to the module; and a switch circuit disposed between the first and second busses and operable to uncouple the first bus from the second bus during the first mode of operation and to couple the first bus to the second bus during a second mode of operation;

wherein the first and second busses each comprise a respective two-wire serial bus.

2. The module of claim 1 wherein the first and second busses are operable to transfer data according to the same protocol.

3. The module of claim 1 wherein at least one of the first and second electronic components comprises a controller.

4. The module of claim 1 wherein at least one of the first and second electronic components comprises a receiver.

5. The module of claim 1 wherein at least one of the first and second electronic components comprises a transmitter.

6. The module of claim 1 wherein the first electronic component comprises a first set of registers coupled to the first bus and a second set of registers coupled to the second bus.

7. The module of claim 1 wherein the first internal electronic component comprises a register operable to control the switch circuit.

8. The module of claim 7 wherein the register is password protected.

9. The module of claim 1, further comprising a transmitter coupled to the second bus.

10. The module of claim 1 further comprising a receiver coupled to the second bus.

11. A method, comprising:
uncoupling a first bus from a second bus during a first mode of operation, the first bus coupling first and second electronic components that are internal to a module, and the second bus coupling the first electronic component to a device external to the module;
allowing data communication between the first electronic component and the device external to the module during the first mode of operation via the second bus; and
coupling the first bus to the second bus during a second mode of operation;
wherein the first and second busses each comprise a respective two-wire serial bus.

12. The method of claim 11 wherein coupling the first bus to the second bus comprises:
writing a first value to a first register via the second bus.

13. The method of claim 12, further comprising:
writing a second value to a second register via the second bus to enable the first register; and
wherein writing the first value to the first register comprises setting a flag in the first register after the first register is enabled.

14. The method of claim 12, further comprising reading a second value from a second register via the first and second busses after the first bus has been coupled to the second bus.

15. The method of claim 14 wherein the second register is inaccessible via the second bus while the first bus is uncoupled from the second bus.

16. The method of claim 12, further comprising writing a second value to a second register via the first and second busses after the first bus has been coupled to the second bus.

17. The method of claim 16 wherein the second register is inaccessible via the second bus while the first bus is uncoupled from the second bus.

18. The method of claim 12, further comprising controlling a module via the coupled first and second busses, at least a portion of the second bus being physically external to the module, the first bus being entirely physically internal to the module.

19. The method of claim 12, further comprising:
writing a second value to a second register, and
uncoupling the first bus from the second bus in response to the second value.

20. The method of claim 12 further comprising: controlling data traffic on the coupled first and second busses with a device that is external to a module within which the first bus is entirely disposed.

21. The method of claim 11 wherein the first bus is inaccessible for physical probing.

22. The method of claim 11 wherein uncoupling the first bus from the second bus comprises:
writing a first value to a first register via the second bus.

23. A fiber-optic communication system comprising:
a first module comprising:
first and second electronic components that are internal to the module;
a first bus coupled to and operable to allow data communication between the first and second electronic components;
a second bus coupled to the first electronic component and operable during a first mode of operation to allow data communication between the first electronic component and a device external to the module; and
a switch circuit disposed between the first and second busses and operable to uncouple the first bus from the second bus during the first mode of operation and to couple the first bus to the second bus during a second mode of operation;
wherein the first and second busses each comprise a respective two-wire serial bus;
a second module comprising:
a third bus operable to allow data communication between electronic components internal to the second module;
a fourth bus operable to allow data communication between an internal electronic component and a device external to the second module; and
a switch operable to couple the third bus to the fourth bus;
wherein the third and fourth busses each comprise a respective two-wire serial bus;
a fiber-optic communication link coupling the first module to the second module; and
a first communication device coupled to the first module and a second communication device coupled to the second module, the first communication device operable to transmit a digital signal to the second communication device via the fiber-optic communication link and the second communication device operable to transmit a digital signal to the first communication device via the fiber-optic communication link.

24. A system comprising:
a communication module comprising:
first and second electronic components that are internal to the module;
a first bus coupled to and operable to allow data communication between the first and second electronic components;
a second bus coupled to the first electronic component and operable during a first mode of operation to allow data communication between the first electronic component and a device external to the module;
wherein the first and second busses each comprise a respective two-wire serial bus; and a switch circuit disposed between the first and second busses and operable to uncouple the first bus from the second bus during the first mode of operation and to couple the first bus to the second bus during a second mode of operation; and an external device operable to connect to the second bus.

25. The system of claim 24 further comprising a controller coupled to the first bus and operable to control the first and second busses while the first and second busses are coupled together.

26. The system of claim 24 wherein the external device is operable to control the first and second busses while the first and second busses are coupled together.

27. The system of claim 24 wherein the external device comprises a fault-analysis device.

28. The system of claim 24 wherein the external device comprises a computer system operable to verify the operation of the communication module.

29. The system of claim 24 wherein the external device comprises a diagnostic device operable to identify an operational error within the communication module.

* * * * *